April 27, 1954

W. Q. GULLEY 2,676,756

ELECTRONIC SCALING CIRCUITS

Filed Nov. 6, 1946

2 Sheets-Sheet 1

INVENTOR.
Willard Q. Gulley.
BY
Robert A. Lorentzen

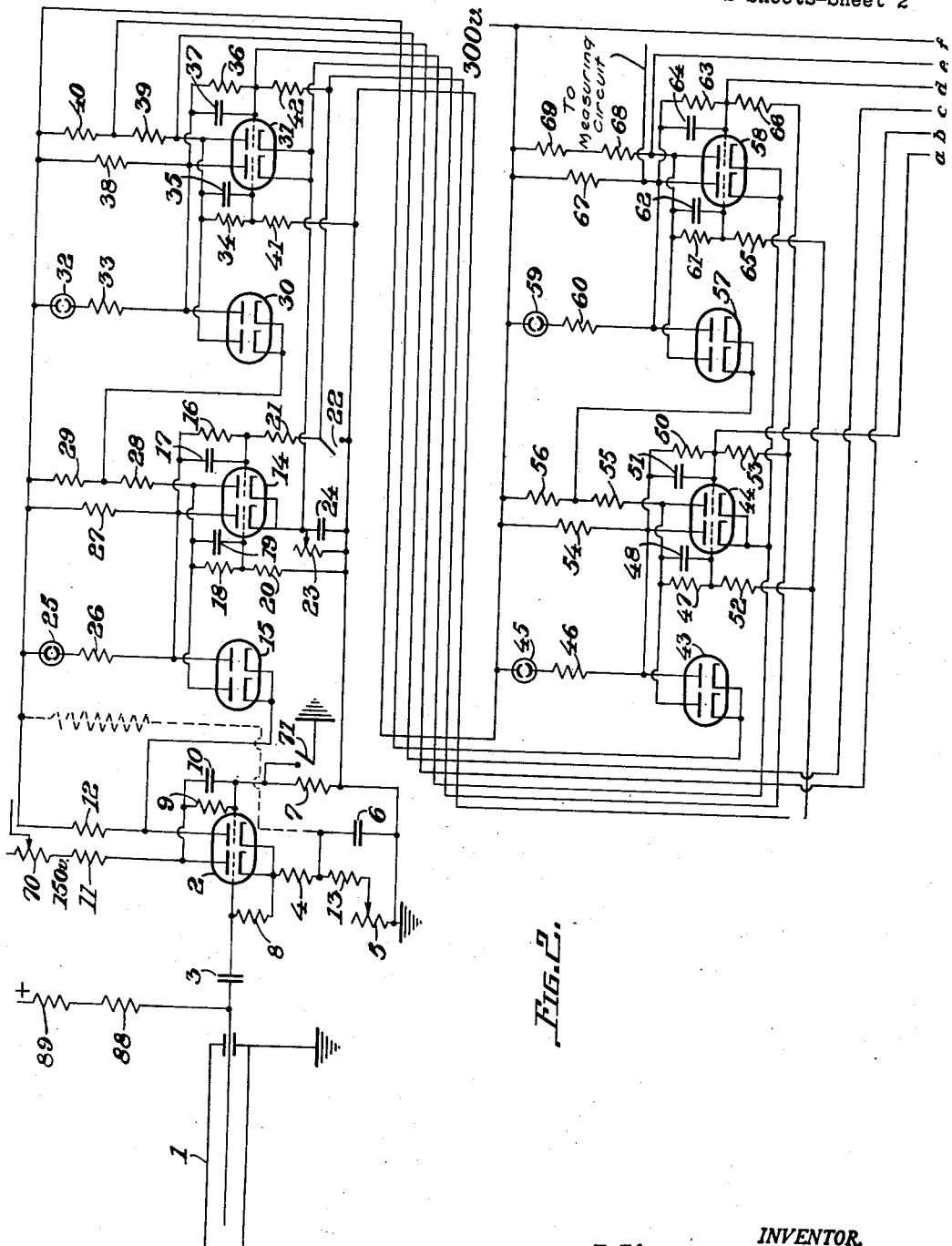

Patented Apr. 27, 1954

2,676,756

UNITED STATES PATENT OFFICE 2,676,756

ELECTRONIC SCALING CIRCUITS

Willard Q. Gulley, Chester, Va., assignor to the United States of America as represented by the United States Atomic Energy Commission Application November 6, 1946, Serial No. 708,090

1 Claim. (Cl. 235—92)

My invention relates to electronic scaling circuits, and more particularly to an improvement for modifying the counting factor of a scaling circuit.

In the detection of radiations from radioactive substances, or otherwise, pulse counting procedures are often used, and for this purpose the Geiger-Mueller counters are very useful instruments. Since such counters are capable of producing pulses at a very high numerical rate, and since it is desirable to operate them at such speeds, a method of recording the pulses is needed. As mechanical devices are not readily adaptable to this purpose, an electronic arrangement, known as a scaling circuit, is employed which selects one of some multiple and records it.

In what is generally known as the Higginbotham scaler, where every 16th pulse, or every 32d pulse, or every 64th pulse is selected, the scaler is said to have a scale of 16, or 32, or 64. However, to accurately compute the number of pulses, it is necessary to multiply the recorded pulses by the factor 16, 32, or 64 as the case may be. Where rapid operation is necessary, this multiplication operation is a limiting factor in the use of the system for obtaining results.

Applicant with a knowledge of this problem has for one object of his invention the provision of a circuit which will affect a modification of this factor to some convenient term such as 10, so that multiplication can quickly, easily, and accurately be made by simply reading the recorder and mentally inserting a zero to the right side of the recorder figure, thus changing thousands to tens of thousands, for example.

Applicant has as another object of his invention the modification of any suitable conventional scaling circuit to make it count in multiples of 10, or other convenient multiples.

Applicant has as another object of his invention the provision of a supplemental circuit for use with a standard scaling circuit to change the recorded multiple, but detachable therefrom without altering the scaling circuit or its components.

Other objects and advantages of applicant's invention will appear in the following specification and the accompanying drawings, and the novel features thereof will be particularly pointed out in the annexed claim.

Figure 1:
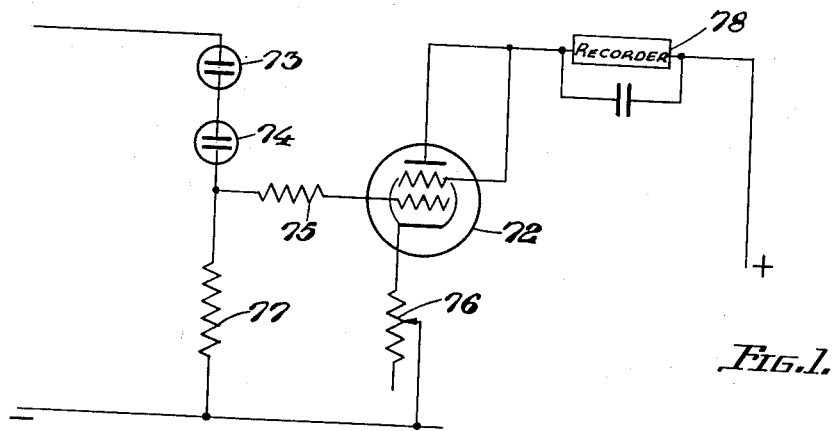

In the drawings, Fig. 1 is a schematic of a conventional measuring circuit.

Figure 3:
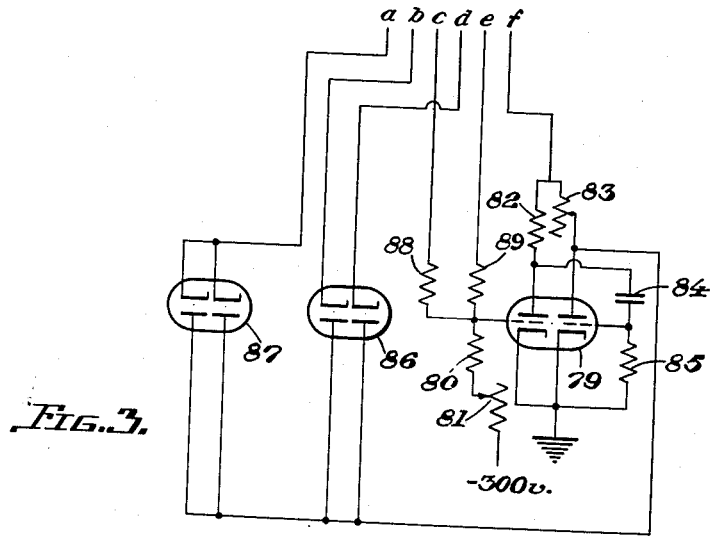

Fig. 2 is a schematic of a conventional scaling circuit. Fig. 3 is a schematic of my improved supplemental circuit adapted to be connected to a conventional scaling circuit.

Referring to the drawings, showing one preferred embodiment of my invention, it will be noted that I have for convenience disclosed my supplemental circuit in Fig. 3 for the purpose of clarifying the disclosure and the description of the operation of the system.

The conventional Geiger-Mueller counter, often refered to as a G. M. tube, is designated 1, as shown in Fig. 2. The center wire of the tube is connected to a source of voltage to be referred to in more detail hereinafter. The center wire of tube 1 is also connected to the grid of the first triode of a double triode tube 2 through a condenser 3, preferably of about 50 mmf. size. The double triode 2 is preferably of the 6SN7 type. The two triode tubes are connected to act as a trigger pair rather than as an amplifier in that all negative pulses of a certain critical value, when applied to the grid of the input triode, will produce large negative pulses at the plate of the second triode, which are substantially independent of the size of the input pulse. In effect, these triodes are connected to provide a special form of multivibrator circuit. The cathodes of the two triodes are tied together and grounded through cathode resistors 4, 5, 13. The variable resistor 5 and fixed resistor 13 are bridged by condenser 6 of preferably 10 mf. size. The grid circuits of the two triodes are grounded by leak resistors 7 and 8, the former being connected to the grid of the second triode and to ground, and the latter being connected from the grid of the first triode to the common cathode connection. The anode of the first triode is connected to the grid of the second triode by a parallel resistance-condenser combination 9, 10 of preferably 400,000 ohms and 500 mmf., respectively. Interposed in the anode-power lead of the first triode is a relatively large load resistor 11 of the order of 25,000 ohms while interposed in the anode power lead of the second triode is a relatively small resistance 12 of the order of 5,000 ohms, although these may be varied to the order of 50,000 and 1,500 ohms, respectively. Bridging the junction between the cathode resistors 4, 13 and the power side of the resistance 12, a relatively large resistance of the order of 20,000 ohms, may be optionally applied.

The anode of the second triode of tube 2 feeds the input of the double triode 14 of the first scaling stage through double diode rectifier 15, feeding in through the cathodes of the latter tube. The anode of the first diode, preferably of the 6H6 type, is connected connected to the anode of the second triode of tube 14, while the anode of the second diode is connected to the anode of the first triode of tube 14, preferably of the 6SN7 type. In addition a neon light 25 and a resistor 26, preferably of one megohm size, are connected in series and bridge the anode of the second diode and the power supply. The anode of the first triode and the grid of the second triode are bridged by a parallel resistance-condenser coupling combination 16, 17 and the anode of the second triode and grid of the first triode are bridged by a parallel resistance-condenser coupling combination 18, 19. In both instances the resistances are preferably of the order of 200,000 ohms, and the condensers of a capacitance of 50 mmf. Each of the control grids of the two triodes of tube 14 are grounded through a resistor preferably of the 100,000 ohm variety, 20, 21, respectively, the latter being connected to ground through the moving contact of a reset switch 22. The moving contact of reset switch 22 is also connected to the grids of subsequent scaling stages to be referred to hereinafter. The cathodes of double triode 14 are tied together and grounded through variable cathode resistor 23, preferably of 2,000 ohms and condenser 24 preferably of .1 mf. connected in parallel. The anodes of the double triode 14 are connected to the B+ supply through the usual resistances 27 and 28, 29. The output of the stage being fed to the next stage from the juncture of resistances 28, 29 through the double diode tube 30. As in the previous stage, the input is fed to the cathodes of the double diode 30, and from the anode of the first diode to the anode of the second triode of the double triode tube 31. Similarly the anode of the second diode of tube 30 is connected to the B+ supply through a neon light 32 and a resistor 33, preferably of one megohm size, in series. Also as in the previous stage, parallel resistor-condenser combination 34, 35 joins the grid of the first triode to the anode of the second triode, and resistor-condenser combination 36, 37 joins the grid of the second triode to the anode of the first triode. The cathodes of double triode 31 are tied together and joined to the cathodes of double triode 14, and this is true of the subsequent stages of this scaling system, as referred to hereinafter. Again the anodes of tube 31 are joined to the B+ power supply through resistances 38, 39, 40 and are of the order of those previously described. The tubes and other elements of this stage are preferably the same size as those of the previous stage.

The second stage feeds into the third stage in the same manner as heretofore described regarding the first and second stages. The output lead from the juncture of the resistances 39, 40 joins the cathodes of double diode 43, while the anode of the first diode leads to the anode of the second triode of the double triode tube 44, and the anode of the second diode joins the anode of the first triode of the double triode tube 44. In the lead from the anode of the second diode to the B+ supply, neon light 45 and resistance 46 are inserted in series. Bridging the anode of the second triode and the grid of the first triode of tube 44 are resistance 47 and condenser 48 in parallel. Bridging the anode of the first triode and the grid of the second triode are resistance 50 and condenser 51, in parallel. The grids of both tubes are grounded through resistances 52, 53. The ground for the grid of the second triode is accomplished through reset switch 22 as well as resistance 53. The cathodes are tied together and to those of tubes 14 and 31. Resistances 54 and 55, 56 are interposed in the B+ supply leads to the anode of the first and second triodes, respectively, of tube 44.

The third stage feeds into the fourth stage in the same manner as heretofore described in connection with the previously referred to stages. This lead from the juncture of resistance 55, 56 joins the cathodes of double diode tube 57. The anode of the first diode is connected to the anode of the second triode of tube 58, while the anode of the second diode is joined to the anode of the first triode of tube 58. The anode of the second diode is also tied to the B+ supply through neon light 59 and resistance 60, in series. Bridging the anode of the second triode and the grid of the first triode of tube 58 are resistance 61 and condenser 62 in parallel. Bridging the anode of the first triode and the grid of the second triode are resistance 63 and condenser 64 in parallel. Connecting the grids of the double triode 58 to ground are resistances 65 and 66, the latter of which is connected through reset switch 22. In the anode to B+ circuits of the triodes of tubes 58 are the usual resistance 67, 68, 69. A lead from the juncture of resistance 67 and the anode of the first triode goes to a measuring circuit such as shown in Fig. 1 with appropriate amplifier to be referred to hereinafter. The foregoing portion of the circuit is what is commonly known as the Higginbotham scaler and may have several more stages than is shown herein. Before describing in detail the supplemental circuit which I have connected thereto in order to modify the scaling circuit, it will be best to describe the operation of the foregoing circuit without reference to my modification.

In its operation, radiations or other ionization in tube 1 cause a flow of electrons from the center wire to the outer shell and thence to ground. Current flow through the load resistors 88 and 89 creates a negative pulse which is fed through condenser 3 to the trigger pair 2. The size of the pulse required to trip the trigger pair can be adjusted by means of the voltage divider 5 in the cathode circuit of the tube. This voltage divider is preferably set slightly beyond the cutoff point of the second triode. With this setting, negative input pulses larger than the tripping height will tend to produce uniform size negative pulses to drive the first scaling stage 14. The plate supply voltage for the first triode of tube 2 is regulated by the variable resistor 70 to about 150 volts. The count is stopped by grounding the grid of the second triode of tube 2 through switch 71.

A negative pulse coming in from the G. M. tube 1 through condenser 3, when applied to the grid of the first triode of tube 2 is inverted and appears as a positive pulse on the anode. Since the anode of the first triode is coupled to the grid of the second triode through resistance 9 and condenser 10, the positive pulse appears upon the grid of the second triode, and is inverted again, appearing as a negative pulse at the output of this tube, passing from the plate thereof on through double rectifier tube 15 to the first scaling stage 14.

The scaling stage 14 is stable in either of two conditions: (1) With the first triode conducting and the second triode cutoff, or (2) with the first triode cut off and the second triode conducting. This is accomplished by means of the resistor network 27, 18, 20 and 28, 29, 16, 21.

With the negative pulse from diode 15 applied to the grid of the first triode of tube 14, the effect will be to reduce the plate current of this triode causing a positive pulse at its plate. Since the anode of the first triode is coupled to the grid of the second triode, the positive pulse from the anode of the first triode will appear on the grid of the second (non-conducting) triode. This causes the second triode to conduct and produces a negative pulse on its anode. Since the anode of the second triode is coupled to the grid of the first triode, the negative pulse thus produced on the anode adds to the effect of the original input pulse. The pair again become stable, but now the first triode is cut off and the second triode is conducting. It is now necessary to apply the negative pulse to the second triode to again trigger the stage. It can thus be seen that two negative pulses coming into the scaling stage will produce one negative and one positive pulse at the anode of the second triode.

In order to use this scaling stage in a practical plural stage system, it is necessary to couple the stages together in such a way that positive pulses from one stage will not be transmitted to the following stages, and so that negative pulses from one stage will be fed only to the conducting triode, or other tube, of the following stage regardless of which one of the pair is conducting. This coupling is accomplished by the double diode tubes 15, 30, 43, and 57 heretofore referred to.

For purposes of illustration, suppose the B+ supply voltage to run around 300 volts, resistance 27 to be about 20,000 ohms, and resistances 28 and 29 to be about 15,000 ohms and 5,000 ohms respectively, resistances 16, 18 to be about 200,000 ohms each, and resistances 20 and 21 to run around 100,000 ohms each.

With the scaling circuit in reset condition, the second diode of tube 30 is conducting since its plate voltage exceeds the cathode voltage. The first diode of the tube is cut off since the plate voltage is less than the cathode voltage; the first triode of tube 31 is cut off and the second triode is conducting. When the first stage is tripped, and the first triode of tube 14 commences to operate, the cathodes of the double diode tube 30 rise to substantially the potential of the power supply. Since this is higher than either plate of the tube, neither diode can conduct. Cutting off the second diode of tube 30 causes a slight reduction in the current through the load resistance 33 and a small voltage increase at its plate. This appears as a small positive pulse at the grid of the second triode of tube 31, but this tube is already conducting and the positive pulse has no controlling effect. Hence, the diode 30 has effectively blocked the passage of a positive pulse from the previous stage. Tripping the first stage again reduces the diode cathode voltage. The plate of the first diode is less than the cathode voltage. Hence, it cannot conduct. The second diode starts to conduct since its plate is at substantially plate supply potential. This added current through the load resistor produces a negative pulse at the plate of the second diode which also appears at the grid of the second triode of the tube 31. This pulse is of a sufficient size to trip the stage. The increased plate voltage of the first diode causes it to become conducting. When the previous stage is tripped again, the cathode of the double diode rises to substantially plate supply potential. This cuts off the first diode. The next time the previous stage trips, the potential of the cathode of the diode falls. This trips the second scaling stage as described hereinbefore.

It can be seen from the foregoing that four trips of the first scaling stage causes two trips of the second scaling stage. This same principle of operation holds for the remaining stages, so that the first stage trips eight times every time the last stage trips once.

The scaling stages are reset by breaking the grid resistor to ground connections of the second triode of each stage with the reset switch 22. This raises the grid potential of the tube and causes it to conduct regardless of other influences on the stage.

Since the neon interpolate light for each stage is connected in series with a resistor, preferably of one megohm, from B+ to the plate of the first triode in each stage, the resetting of the scaler will cut off the first triode of each stage and the interpolate lights will be out. As an optional arrangement, the common cathode bias may be provided for all scaling stages. The only adjustment necessary to tune up properly constructed scaling stages is proper adjustment of the common cathode bias. All stages will scale properly over a wide range of bias adjustment. However, the bias should be set as high as is consistent in order to reduce B+ drain and heat generation.

Referring now particularly to Fig. 1 showing the measuring circuit, 72 designates an amplifier, preferably of the 6L6 beam power type, the control grid of which is fed from the output of the last scaler stage, and preferably the first tube of that stage, through neon lights 73, 74, and a resistor 75, preferably of the one megohm variety. The cathode is connected to ground through a variable resistor 76, and the grid is grounded through resistor 77. The plate and screen grid are tied together and coupled to a conventional measuring device such as a wizard recorder 78 made by the Production Instrument Company of Chicago, Illinois, and set forth in Catalogue No. EC-94, through the output circuit of the tube. However, any other appropriate indicator or recorder may be employed for the purpose.

The tube 72 of the output or recorder stage is ordinarily biased beyond cutoff by resistor 76 in the cathode circuit. This eliminates degeneration in the cathode circuit and gives a negative square wave to the wizard recorder.

The output stage operates on a positive pulse from the plate of the first triode in the last scaling stage. The two neon lamps which couple the last scaling stage to the output of the beam power tube allow the grid to vary from ground potential to a more positive potential than the cathode.

This is preferably accomplished by about a 150 volt subtraction from the scaling plate voltage which normally varies from 280 to 150 volts. With 150 volt cathode bias, the beam power tube grid to the cathode potential varies from about −150 to +25 volts. Grid current through the one megohm stopping resistor actually causes the grid to rise only slightly above cathode potential.

Referring now to the supplemental circuit of Fig. 3 for altering the count of the foregoing scaling circuit, the plates of the second triodes of tubes 31, 58 of the second and fourth stages are joined to one side of resistors 88, 89, respectively, whose opposite ends are tied together and to the control grid of the first triode of tube 79 which is preferably of the 6SN7 variety. This juncture is also connected to resistors 80, 81 which in turn are connected in series and to a large negative biasing potential preferably −300 volts.

The plates of tube 79 receive their potentials from the B+ supply through resistances 82, 83, the latter of which is variable. The plate of the first triode is also coupled to the grid of the second triode through condenser 84, and the grid of the second triode is further coupled to the cathodes of both triodes through resistance 85, it being noted that the cathodes of both triodes are tied together and grounded. The plate of the second triode of tube 79 is coupled to the grid of the second triode of tubes 31, 58 and to the grid of the second triode of tube 44 through the double diodes 86 and 87 respectively, the latter of which may be a single diode if desired.

Upon the operation of the reset switch, thus disconnecting grid to ground connection, the grid potentials rise until the second triodes of each stage begin to fire. In this condition the various neon lights are extinguished. At this time it will be seen that the first triode of tube 2 is operating since the grid is tied to the cathode while in the second triode the grid is tied to ground so that flow of current through resistances 4, 5, 13 tends to bias the second triode to cut off. A negative pulse from the G. M. tube 1 through coupling condenser 3 to the grid of first triode of tube 2 lowers the potential of the grid, causing the tube to cut off and a positive pulse to appear on the plate of that triode. However, it is coupled with the grid of the second triode so that the positive pulse appears on that grid, and with the potential on the cathode of the second triode falling, due to the blocking of the first triode, the second triode begins to fire. This produces a negative pulse on the plate of the second triode of tube 2. This pulse is passed on to the cathode of the double diode tube 15 causing the second diode to fire and the first scaling stage to flip, blocking the second triode and rendering operative the first triode of tube 14, which lights the first neon light 25, as described more in detail heretofore.

The second pulse from tube 1 causes the first stage to flip again and also causes the second stage to flip. This latter action blocks the second triode and operates the first triode of tube 31. In this way the first neon light 25 is extinguished, and the second neon light 32 is energized and lights up.

In similar manner the third stage is tripped on the fourth count lighting up neon light 45, and the fourth stage is tripped on the eighth count lighting up neon light 59. However, the tripping of the fourth stage follows a second tripping of the third stage which extinguishes neon light 45. On the tenth count both neon lights 32 and 59 are lighted.

Since the recorder only operates on positive pulses and is connected to the anode of the first triode of tube 58, it normally records on the 16th count in this particular Higgenbotham circuit. However, with the supplemental circuit, the 10th pulse flips the second stage rendering the second triode of tube 31 inoperative. This puts a positive pulse on the grid of the first triode of tube 79. At this time the second triode of tube 58 is blocked. This causes the first triode of tube 79 to operate and a negative pulse to appear at the plate. Being coupled to the second triode of that tube, it is transferred to the grid of the second triode, blocking it and causing a positive pulse to appear on the plate. This positive pulse passes through the double diode 86 and appears on the grids of the second triodes of tubes 31 and 58 of stages 2 and 4, respectively, causing them to fire and effectively acting as a reset for them. This blocks the first triodes of the those tubes. The flipping of stage 2 would have the effect of flipping stage 3 by rendering the first triode of tube 44 operative and the second inoperative. However, to prevent this action from occurring, the positive pulse from the plate of the second triode of tube 79 is also passed through diode 87 (which may either be of the single or double type) to the grid of the second triode of tube 44. This keeps that tube operating and overcomes the tendency of the third stage to flip as a result of the firing of the second triode of tube 31. Since the second triode of tube 14 of the first stage is normally operating on the 10th count, and since the actions of the subsequent stages do not change its operation, no provision has been made for resetting this stage by the supplemental circuit.

The resetting of the fourth stage causes the first triode of tube 58 to cease firing, and this produces a positive pulse at the plate which is fed to the recorder and actuates it, so that every tenth pulse is recorded on the recorder.

Inasmuch as the plates of the second triodes of tubes 31 and 58 of stages 2 and 4 are joined to the input of the first triode of tube 79, the question may arise as to whether the supplemental circuit disclosed herein would not reset tubes 31, 44, and 58 on the second, sixth, and eighth counts of the scaling circuit. In this connection it may be noted that on the second and sixth counts, the second triode of tube 31 of the second stage becomes inoperative placing a positive pulse on the grid of the first triode of tube 79. However, this tube does not fire because at that time the second triode of tube 58 is operating, and its plate potential is sufficiently low that the positive pulse from the plate of tube 31 when added thereto will not overcome the negative bias of the first triode of tube 79. Likewise, on the eighth count when the second triode of tube 58 of the fourth stage becomes inoperative, a positive pulse is fed to the grid of the first triode of tube 79, but at that time the second triode of the tube 31 of the second stage is also operating and its low potential plus the positive pulse from the second triode of tube 58 is insufficient to overcome the negative bias on the grid of the first triode of tube 79. On the other hand, this situation does not exist on the tenth count where the first triode of tube 31 is operating and the potential on the plate of the second triode of tube 31 is relatively high. That taken with the positive pulse from the plate of the second triode of tube 58 when it ceases to operate is sufficient to overcome the negative bias on the first triode of tube 79 and cause it to operate as heretofore described.

As previously pointed out, the last digit of the count of the recorder could be ascertained by multiplying the recorder reading by ten, but this might be inaccurate from 0 to 9 units. An accurate reading could be obtained by using the interpolate lights. For instance, if the neon lights to stages one and there are lit, the count would be 1+4 or 5. This, then would become the digit to be entered at the right of the recorder reading instead of the 0 which would result from multiplying by ten.

If two of these units or circuits are connected in series or cascade, and the neon interpolate lights are used in both circuits, thus providing a scale of 100, the exact count can be determined. The neon lights of the first unit or circuit will serve as the unit count while the neon lights of the second unit or circuit will indicate tens. A recorder connected to the output of the second unit will read in hundreds, that is, two digits will be added to the right of the figure given by the recorder. If, for instance, the recorder reads 962, then by this process, the count would be 96,200. However, by using the interpolate lights, the exact figures for the last two digits can be ascertained. As an example, if the first and last neon lights are energized in the first unit, the count is 1+8 or 9. If, also, the first and third neon lights are energized in the second unit, the count would be 1+4 or 5. As the first unit counts in units, and the second counts in tens, the result is 59, and the total count is 96,259.

Having thus described my invention, I claim:

A system of the character described comprising a series of stages connected together in cascade, each of said stages including a pair of trigger tubes fed through a rectifier and operating alternately in response to pulses fed thereto to pass alternate pulses, a recorder coupled to the last of said stages to record a predetermined multiple of the pulses fed to the system, and an electric discharge device coupled to the output of one of the trigger tubes of each of two of said stages and to the input circuits of a plurality of said stages and responsive to signals from said tubes when they are blocked to operate said stages and reset the system and alter the multiple of the pulses fed to the recorder.

References Cited in the file of this patent

UNITED STATES PATENTS

| Number | Name | Date |
|---|---|---|
| 2,521,788 | Grosdoff | Sept. 12, 1950 |
| 2,527,633 | Grignon | Oct. 31, 1950 |
| 2,538,122 | Potter | Jan. 16, 1951 |
| 2,552,781 | Halfield | May 15, 1951 |

OTHER REFERENCES

Proceeding of Cambridge Philosophical Society; W. B. Lewis; volume 33; 1937; pages 549–558.

Electronics, June 1944; pages 110–113, 358 and 360.

RCA Review, September 1946; volume 7, No. 3; article on "Electronic Counters."